Figure 1:
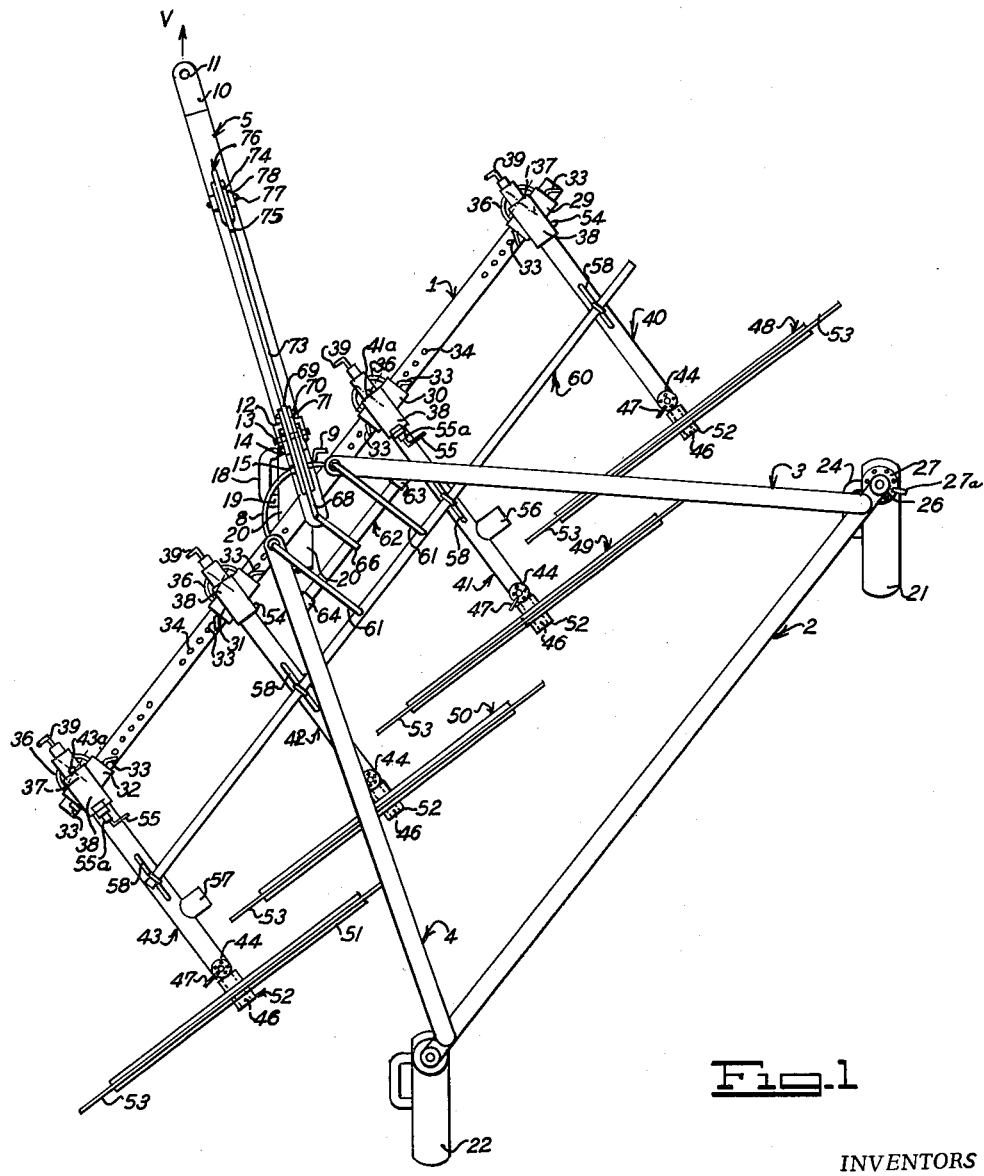

July 25, 1961 C. VAN DER LELY 2,993,325
RAKING DEVICE
Filed March 1, 1957 2 Sheets-Sheet 1

INVENTORS
CORNELIS VAN DER LELY

July 25, 1961 C. VAN DER LELY 2,993,325
RAKING DEVICE
Filed March 1, 1957 2 Sheets-Sheet 2

INVENTORS
CORNELIS VAN DER LELY

United States Patent Office 2,993,325
Patented July 25, 1961

2,993,325
RAKING DEVICE
Cornelis van der Lely, Maasland, Netherlands, assignor to C. van der Lely N.V.
Filed Mar. 1, 1957, Ser. No. 643,376
Claims priority, application Netherlands Mar. 9, 1956
6 Claims. (Cl. 56—377)

This invention relates to raking devices for laterally displacing crop or like material lying on the ground, and more particularly to devices of the kind comprising a frame movable on ground wheels, and a plurality of rake wheels each of which is arranged oblique to the intended direction of travel of the device, each wheel being mounted for rotation about a substantially horizontal axis and being rotated by coming into contact with the ground or material lying thereon.

Devices of the kind set forth above are known, but have the disadvantage either that they can be employed in one only working position or that they can only be moved into a second working position with difficulty, and it is an object of the invention to obviate this disadvantage.

According to the invention, there is provided a raking device, for laterally displacing crop or like material lying on the ground, comprising a frame and a plurality of rake wheels which are connected to the frame by means of supports. Each wheel is mounted for rotation about a substantially horizontal axis and in a manner so as to be rotated by coming into contact with the ground and/or the crop lying thereon. The invention further contemplates a support rotatable about a substantially horizontal pivotal shaft which is at an angle to the axis of rotation of a rake wheel mounted thereon so that the support with its rake wheel is adjustable in a horizontal plane with respect to an adjacent support.

With this construction, there exists the possibility of providing a machine which can be readily brought into different working positions, and each rake wheel can be adjusted independently of the position of the ground wheels with respect to the ground by turning the support member about the horizontal axis so that the rake wheels can be readily adjusted to the irregularity of the ground. It is also possible to associate a plurality of rake members to form one or more groups, each group being connected to the frame by means of a respective support member, whereby the device can be brought into a position in which it can act as a swath turner. In this case, two adajacent rake wheels are arranged to be coupled with one another by means of the support member of one of the rake wheels so that no connecting pieces need be employed with the device.

Figure 2:
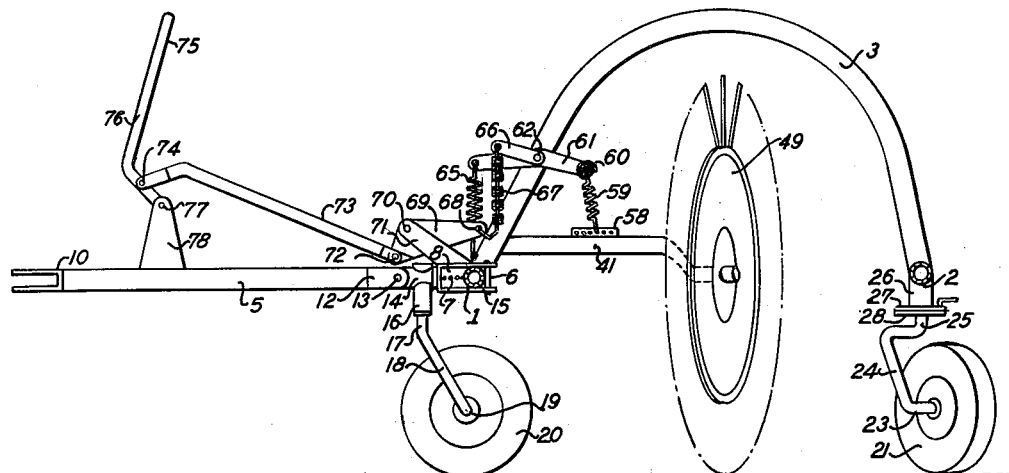
Figure 3:
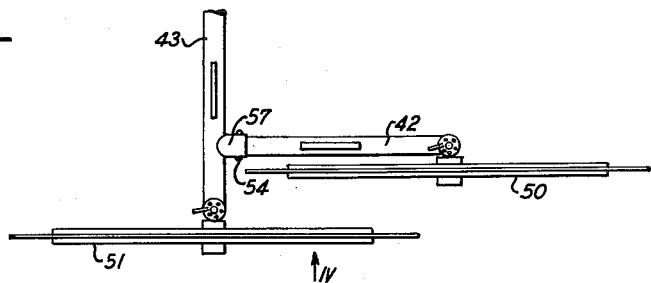
Figure 4:
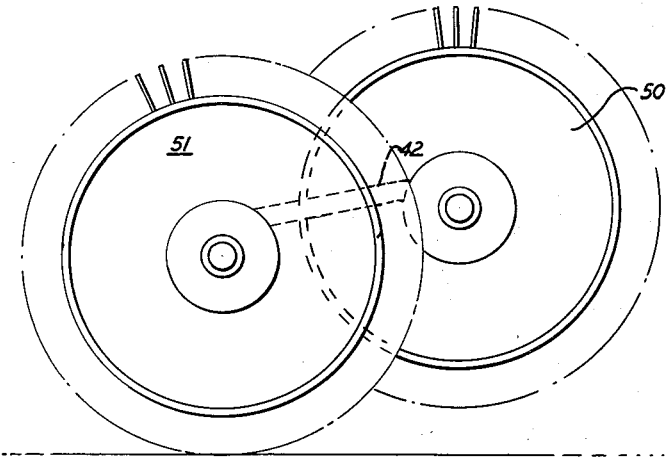

For a better understanding of the invention, and to show how the same may be carried into effect, reference will next be made to the accompanying drawings in which:

FIG. 1 is a plan view of a raking device of the invention in a first working position, FIG. 2 is a lateral view of the device partially broken away, FIG. 3 is a plan view of part of the device in a further working position, and FIG. 4 is a rear elevational view of the part of the device shown in FIG. 3, viewed in the direction of the arrow IV of FIG. 3.

In FIGURES 1 to 4, there is shown a side delivery rake comprising a mobile frame which essentially consists of two parallel tubes or frame beams 1 and 2, which are rigidly secured to one another by bows or arch members 3 and 4, a horizontal traction arm 5 being secured to the tube 1 and being rotatable about a vertical shaft 6. The tube 1 supports a semi-circular strip 8 formed with apertures 7, and the traction arm 5 is provided with a locking pin 9, which is inserted into one of the apertures 7, and with the aid of which the traction arm 5 can be fixed in a number of positions relative to the tube 1. The free end 10 of the traction arm 5 is forked, and is formed with apertures 11, through which a pin can be passed to fasten the device to a tractor (not shown). The traction arm 5 has a section 12 connected with a horizontal pivot 13. Part 14 of the arm 5 lying between the pivot 13 and the shaft 6 has a fork 15 which engages about the strip 8 and the tube 1, the part 14 also carrying a vertical sleeve 16, in which a shaft 17 is rotatable. The shaft 17 is coupled by a rod 18 to the shaft 19 of a caster ground wheel 20. Two ground wheels 21 and 22 support the ends of the tube 2, the two ground wheels 21 and 22 being of the same construction which will next be described with reference to the wheel 21. The axle 23 of the wheel 21 is connected, via a rod 24, to a vertical shaft 25 which is freely rotatable in a sleeve 26, which is rigidly secured to the tube 2. The axle 23 is not disposed vertically below the center line of the shaft 25 so that the wheel 21 is a caster wheel. However, the sleeve 26 is provided at its lower end with a perforated ring 27, against which a perforated ring 28 bears, the ring 28 being secured to the shaft 25. A locking device or pin 27a can be passed through registering apertures in the two rings or pivot means 27 and 28, so that the wheel 21, and likewise the wheel 22 can be fixed in any one of a number of positions.

Four sleeves or horizontal hinge means 29, 30, 31 and 32 are mounted on the tube 1 so as to be freely rotatable about the longitudinal axis of tube 1, movement of the sleeves in the axial direction of the tube being prevented by eight pins 33, which are passed through holes 34 in the tube 1, with one pin being positioned at each end of each sleeve. The three successive distances between the sleeves 29 to 32 may be varied, as desired, by altering the disposition of the pins and their associated sleeve. The sleeves 29 to 32 are each provided with a curved, apertured strip 36, and with a vertical hinge means or pivot pin 37 (diagrammatically illustrated) for a sleeve 38, each pin passing through the center of curvature of its associated strip 36. Each sleeve 38 is provided with a locking pin 39, by means of which the position of a sleeve 38 can be fixed relative to a strip 36. Four tubular supporting arms or pivot means 40, 41, 42 and 43 are disposed in the four sleeves 38, the free ends of the arms 40 to 43 each supporting a member or vertical hinge means 44 which has a substantially vertical pivot axis. The members 44 connect substantially horizontal axles 46 respectively to arms 40 to 43, the members being capable of being fixed in a number of positions by means of locking pins 47. The arms 40 to 43 carry rake wheels 48, 49, 50 and 51, and hubs 52 of these rake wheels are rotatably mounted one on each axle 46, the rake wheels being provided with circumferential teeth 53 for displacing the crop to be worked.

The arms 40 and 42 are immovably secured in their respective sleeves 38 with the aid of pins 54, which can be readily removed to loosen the arms 40 and 42. The arms 41 and 43 are secured in their respective sleeves 38 in a manner such that they are rotatable in these sleeves about their longitudinal axes, axial movement of the arms 41 and 43 being, however, prevented by the provision of lugs 55A on the arms 41 and 43 and of pins 41A and 43A passing through the arms 41 and 43. The arms 41 and 43 are adapted to be fixed in the sleeves 38 with the aid of locking pins 55 which are slidable in the lugs 55A. The arms 41 and 43 are provided with short tube pieces 56 and 57, which extend sideways from the arms, and into which the ends of the arms 40 and 42 can be introduced, when the arms 40 and 42 have been removed from the sleeves 38. The ends of the arms 40 and 42 are adapted to be fixed in position with the aid of pins 54 in the same manner as they were fixed in the sleeves 38. Thus, by placing the arm 42 in the tube piece 57 of the arm 43 the working position shown in FIGURES 3 and 4 is obtained, the device being suitable for use as a swath turner when in this position.

The device is provided with a lifting means L. More particularly, the arms 40 to 43 are each provided on their upper sides with an apertured strip 58, one end of each of four springs 59 being secured to a respective strip 58. The other ends of the four springs 59 are sidably secured to a rod 60, which is connected by two levers 61 to a rotary shaft 62 extending parallel to the rod 60 and journalled in a bearing 63 on the bow 3 and a bearing 64 on the bow 4. The levers 61 extend from the rod 60 beyond the shaft 62 and are secured at their front ends each to the top end of a counter-spring 65, the bottom ends of which are secured to the frame at the junctions between the tube 1 and the bows 3 and 4 respectively. At its center, the shaft 62 carries an arm 66, the free end of which lies exactly over the shaft 6 of the arm 5. A short chain 67 connects the free end of the arm 66 with one end 68 of a rocker 69, which end 68 also lies substantially over the shaft 6. The rocker 69 is rotatable about a shaft 70 which is supported by a fork 71, the fork 71 being secured to the top limb of the fork 15. A further point 72 of the rocker 69 is articulated to one end of a rod 73 the other end 74 of which is secured to a lever 76 provided with a handle 75. The lever 76 is mounted for rotation about a pivot 77 disposed at one end of a lug 78 secured to the arm 5.

When the device shown in FIG. 1 is moved in the direction V by a tractor which is connected at point 11 to the traction arm 5, the rake wheels 48 to 51 will cause the device in the working position shown in FIG. 1 to operate as a side delivery rake. The height of the rake wheels 48 to 51 relative to the frame is variable owing to the rotatability of their shafts on the tube 1, and the rake wheels bear on the ground with less than their full weight owing to the presence of the springs 59 and the springs 65 which tend to lift the arms 40 to 43.

The supports 40, 41, 42 and 43 respectively with their rake wheels may be adjusted in a horizontal plane with respect to their adjacent supports. In this way, it is possible to alter the distance between two consecutive rake wheels which is desirable in order to meet the requirements for raking different types of crops. It is also possible to alter the way in which a rake wheel will engage the crop. In one position, the crop will be more in contact with the side of the rake wheel than in another position, wherein especially the tines will be in contact with the crop.

The supports 40, 41, 42 and 43 may slide over the tube 1 and may be fixed in a number of working positions by means of the pins 33.

During the operation of the device, the arm 5 will not rotate about the shaft 13 to an appreciable extent. When the handle 75 is moved forwardly and downwardly to the maximum extent by the driver of the tractor, the rod 73 causes the rocker 69 to turn so that the end 68 moves downwardly in a substantially vertical direction. This causes the chain 67 to pull the arm 66 downwardly and rotates the shaft 62 in such a way as to lift the rod 60, and, whatever the angle between the arm 5 and the tube 1, the arm 66 will always be pulled downwardly so that the rod 60 is moved upwardly. Thus, rake wheels 48 to 51 are raised from contact with the ground to an extent such that the device can be transported over a field or a road without the risk of damaging the device, the field or the road.

Since the pivot 77 lies above the junction line of the elements 73 and 72 even when the handle 75 is in its down position, the rake wheels are held in their raised position when the driver lifts his hand from the handle in this position.

When the device is used as a swath turner (see FIGURES 3 and 4), the rake wheels 49 and 51 are suspended by means of the springs 59 from the rod 60, but the rake wheels 48 and 50 are dismounted from the tube 1 and their arms 40 and 42 are entered into the tube pieces 56 and 57 respectively. The arms 41 and 43, having been turned through a small angle in their sleeves 38 and locked in a new position, ensure that the rake wheels 48 and 50 are raised from contact with the ground so that they do not engage with and displace the crop. Also, in this case, the rake wheels can be lifted from the ground by moving the handle 75 into its down position.

What I claim is:
1. A device for laterally displacing material lying on the ground comprising a mobile frame including a frame beam, ground wheels on and supporting said frame, at least two freely rotatable rake wheels, supporting arms supporting said rake wheels, horizontal hinge means operatively associated with said frame and said arms and supporting the latter on the frame, means on said supporting arms and operatively associated with said rake wheels for adjusting the position of the rake wheels with regard to said arms, lifting means on said frame and operatively associated with said arms for lifting the rake wheels out of contact with the ground and crop lying on the ground by rotating the arms about said horizontal hinge means, at least two of said ground wheels being coupled to said frame beam, said frame beam in the working position of said device as side delivery rake being positioned behind the rake wheels, said mobile frame including at least one arch member connected to said frame beam and extending over said rake wheels and a draw arm connected to said frame adjacent said arch member.

2. A device as claimed in claim 1, wherein said means for adjusting the rake wheels with regard to said supporting arms comprise vertical hinge means operatively associated with said supporting arms and rake wheels and supporting the latter on the supporting arms.

3. A device as claimed in claim 1, wherein at least one of the ground wheels connected to said frame beam is adjustable about a vertical axis and lockable in different positions with regard to said frame beam.

4. A device as claimed in claim 1, comprising vertical hinge means operatively associated with said frame and the arms and supporting the latter on the frame.

5. A device as claimed in claim 1, comprising means on said arms for supporting a further rake wheel.

6. A device as claimed in claim 1, comprising a pivot device coupling said draw arm to said frame for adjustment of the relative positions of the same.

References Cited in the file of this patent

UNITED STATES PATENTS

| | | |
|---|---|---|
| 2,532,652 | Wray | Dec. 5, 1950 |
| 2,670,588 | Plant | Mar. 2, 1954 |
| 2,712,723 | Ryan | July 12, 1955 |
| 2,811,009 | Plant | Oct. 29, 1957 |

FOREIGN PATENTS

| | | |
|---|---|---|
| 1,014,517 | France | June 18, 1952 |
| 163,026 | Australia | May 25, 1955 |